United States Patent
Yoo

(10) Patent No.: US 8,255,937 B2
(45) Date of Patent: Aug. 28, 2012

(54) SPINDLE MOTOR HAVING A CLAMPING DEVICE

(75) Inventor: Jin Seung Yoo, Gyeonggi-do (KR)

(73) Assignee: LG Innotek Co., Ltd., Seoul (KR)

( * ) Notice: Subject to any disclaimer, the term of this patent is extended or adjusted under 35 U.S.C. 154(b) by 197 days.

(21) Appl. No.: 12/647,682

(22) Filed: Dec. 28, 2009

(65) Prior Publication Data

US 2010/0164335 A1 Jul. 1, 2010

(30) Foreign Application Priority Data

Dec. 29, 2008 (KR) .................. 10-2008-0135973

(51) Int. Cl.
*G11B 17/30* (2006.01)
(52) U.S. Cl. ................................................. 720/707
(58) Field of Classification Search .......... 720/707, 720/703, 704, 708, 709
See application file for complete search history.

(56) References Cited

U.S. PATENT DOCUMENTS

| | | | | |
|---|---|---|---|---|
| 4,864,443 A * | 9/1989 | Peterson | .................... | 360/99.12 |
| 5,243,481 A * | 9/1993 | Dunckley et al. | .......... | 360/99.08 |
| 5,296,981 A * | 3/1994 | Ogawa | ....................... | 360/99.08 |
| 5,799,006 A * | 8/1998 | Mukawa | ........................ | 720/707 |
| 6,041,033 A * | 3/2000 | Otsubo et al. | ................. | 720/707 |
| 6,421,312 B1 * | 7/2002 | Liao et al. | ..................... | 720/707 |
| 6,542,330 B1 * | 4/2003 | Choo et al. | ................. | 360/99.12 |
| 6,826,771 B1 * | 11/2004 | Wada | .............................. | 720/707 |
| 6,868,549 B2 * | 3/2005 | Watanabe et al. | ............. | 720/715 |
| 7,313,801 B2 * | 12/2007 | Choi et al. | .................... | 720/709 |
| 2006/0048176 A1 * | 3/2006 | Choi et al. | .................... | 720/707 |
| 2007/0192779 A1 * | 8/2007 | Oota | ............................. | 720/707 |

* cited by examiner

*Primary Examiner* — David D Davis
(74) *Attorney, Agent, or Firm* — Saliwanchik, Lloyd & Eisenschenk

(57) ABSTRACT

A spindle motor is disclosed which is configured such a manner that a rotor is press-fitted into a portion of a rotor fastener corresponding to a radially thicker portion out of outer portions of the rotor fastener of a clamping device, and a portion of the rotor fastener corresponding to a relatively thinner radial portion is filled up with an adhesive to adhesively couple a case with the rotation shaft side. Consequently, even if the rotation shaft side is coupled with the case, the case is not damaged to therefore enhance the reliability of the product.

9 Claims, 4 Drawing Sheets

SPINDLE MOTOR HAVING A CLAMPING DEVICE

CROSS-REFERENCE TO RELATED APPLICATION

This application claims the benefit under 35 U.S.C. §119 of Korean Application Number 10-2008-0135973, filed Dec. 29, 2008, which is hereby incorporated by reference in its entirety.

BACKGROUND

The present disclosure relates to a spindle motor used for optical devices.

An optical disk device is a device for optically inputting data in or outputting data from an optical disk. The optical disk device usually includes an optical pickup for accessing data of an optical disk, a spindle motor for rotating the optical disk and a feeding motor for moving the optical pickup to an inner periphery or an outer periphery direction of the optical disk.

A spindle motor is installed inside an optical disk drive, and performs a function of rotating a disk to enable an optical disk pickup to read data recorded on the disk. A slim-type spindle motor used for a notebook is installed with a clamping device for supporting a disk.

BRIEF SUMMARY

The present disclosure intends to provide a spindle motor capable of inhibiting a case from being partially damaged during assembly between the case and a rotor to thereby enhance reliability of a product.

A spindle motor according to one aspect of the present disclosure can include a rotor including a rotation shaft and a rotor yoke simultaneously rotating with the rotation shaft and mounted with a disk, and a clamping device attachably and detachably supporting the disk and provided with a rotor fastener coupled to the rotor. The rotor fastener can alternatively includes a first guide portion for press-fitting the rotor and a second guide portion for non-press-fitting the rotor.

DETAILED DESCRIPTION

Reference will now be made in detail to a spindle motor according to exemplary embodiments of the present disclosure, examples of which are illustrated in the accompanying drawings.

Figure 1:
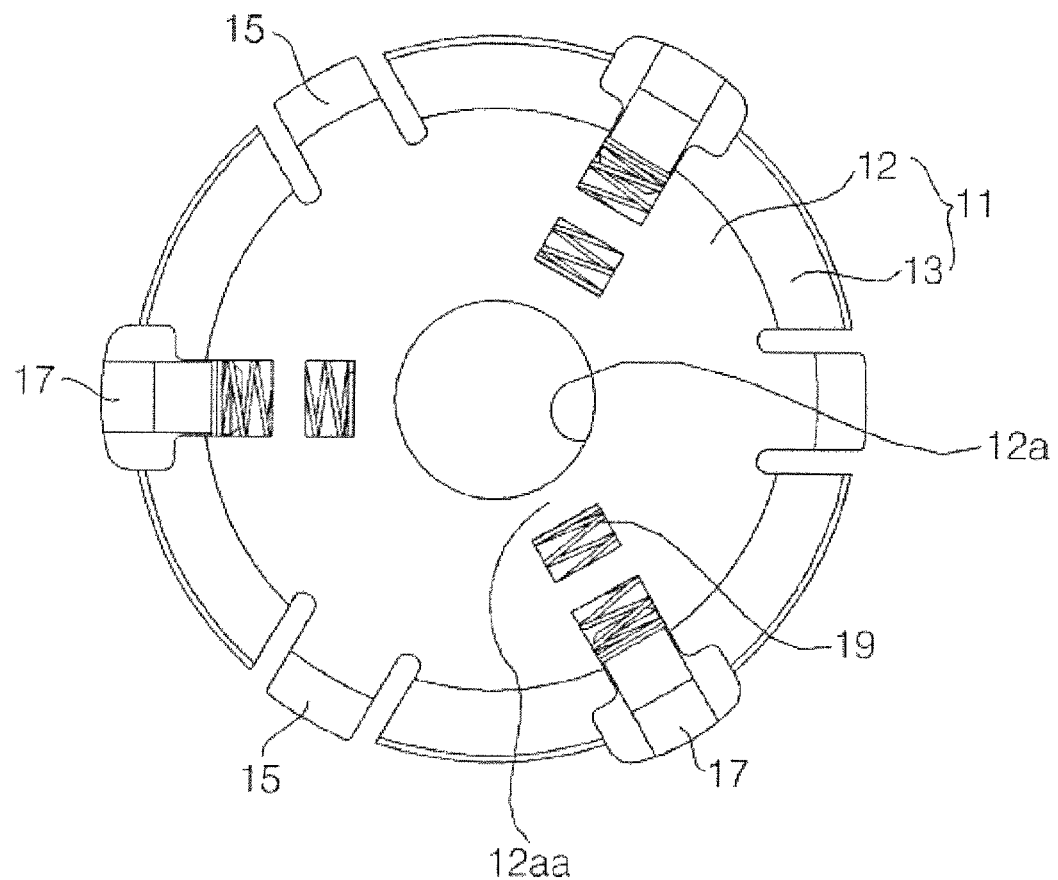
FIG. 1 is a plan illustrating a clamping device of a spindle motor corresponding to an imaginary comparative exemplary embodiment for comparing with the present disclosure.

FIG. 1 is a plan illustrating a clamping device of a spindle motor corresponding to an imaginary comparative exemplary embodiment for comparing with the present disclosure.

A clamping device 10 includes a case 11 having a support plate 12 formed with a substantially pipe-shaped rotor fastener 12a to which a rotor (not shown) is coupled and a lateral plate 13 bent from an edge of the support plate 12 and inserted at an outer periphery thereof by a disk (not shown), a plurality of claws 15 integrally formed at the lateral plate 13 for supporting the disk in order to align the center of the mounted disk with the center of the rotation shaft, a plurality of arms 17, one side of which is positioned at an outer side of the lateral plate 13, while the other side of which is positioned inside the lateral plate 13, for inhibiting the disk from disengaging from the lateral plate 13 while reciprocating, and a resilient member 19 resiliently supporting the arm to the outside of the lateral plate 13.

The arm 17 is linearly installed in the form of engaging with or disengaging from the lateral plate 13 in the radial direction of the case 11. Accordingly, the case 11 is formed therein with a space in which the arm 17 can move. Therefore, a portion 12aa of the support plate 12 outside of the rotor fastener 12a installed with the arm 17 is axially very thin.

The clamping device 10 is therefore feared to be damaged at the portion 12aa of the support plate 12 outside of the rotor fastener 12a opposite to the arm 17 if the rotor is press-fitted into the rotor fastener 12a. Consequently, there is a disadvantage of the product being deteriorated in reliability. An exemplary embodiment of the present disclosure to improve the disadvantage is shown in the following drawing.

Figure 2:
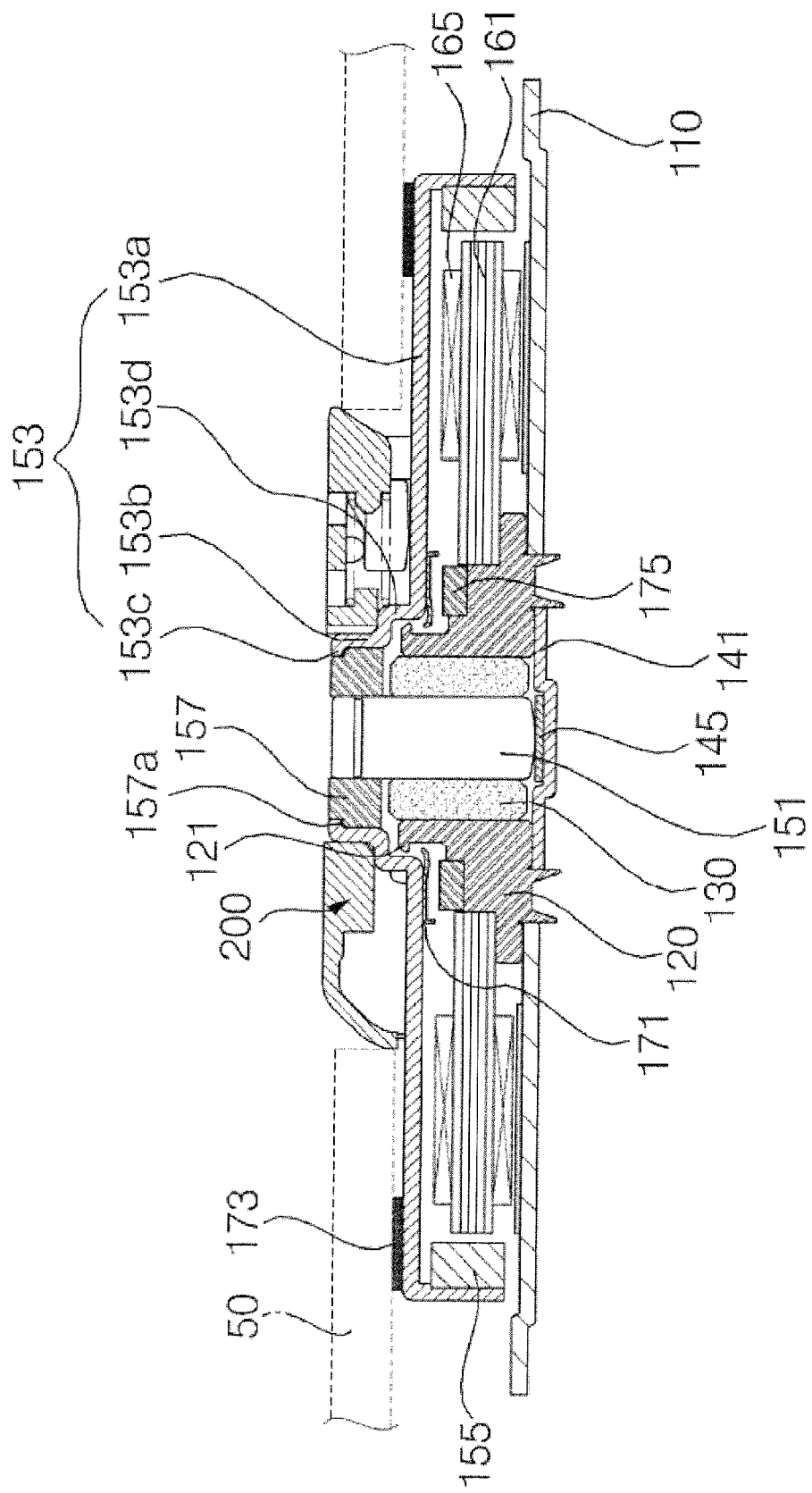
FIG. 2 is a cross-sectional view illustrating a spindle motor according to an exemplary embodiment of the present disclosure.

FIG. 2 is a cross-sectional view illustrating a spindle motor according to an exemplary embodiment of the present disclosure.

Referring to FIG. 2, a substantially cylindrical bearing housing 120 is installed upright on a base 110.

Hereinafter, in description of directions and surfaces of constituent elements including the base 110, a surface and a direction facing a vertical upper side of the base are referred to as 'upper surface and upper side' and a surface and a direction facing a lower side of the base are referred to as 'lower surface and lower side'.

The spindle motor includes the bearing housing 120 which in turn is provided in a cylindrical shape with an open bottom, where a lower end open surface of the bearing housing 120 is sealed by a thrust stopper 141 and a lower surface of the sealed bearing housing 120 is coupled with the base 110.

The bearing housing 110 is supportively installed by a lower periphery of a rotation shaft 130. A rotor yoke 153 is coupled to an outer periphery at an upper end of the rotation shaft 151, and the rotor yoke 153 is coupled with a magnet 155, such that the rotation shaft 151, the rotor yoke 153 and the magnet 155 comprise the rotor. The rotor yoke 153 has a substantially cylindrical shape with its lower surface opened, and is installed at an upper surface with a body 153a on which a disk 50 is mounted and a coupling pipe 153b protruding from an upper central section of the body 153a to an upper side and coupled at an inner periphery with the rotation shaft 151. The magnet 155 is coupled to an inner periphery of the body 153a.

The bearing housing 120 is coupled at an outer periphery with a core 161 and a coil 165 is wound on a core 161. The core 161 and the coil 165 comprise a stator. The stator is wrapped by the body 153a of the rotor yoke 153 to face the magnet 155.

Accordingly, when a current is applied to the coil 165, the rotor 160 is rotated by electromagnetic fields formed between the coil 165 and the magnet 155.

The coupling pipe 153b serves to increase a coupled area between the rotation shaft 151 and the rotor yoke 153 to support in such a manner that the rotation shaft 151 and the rotor yoke 153 are mutually secured. A bush 157 may be interposed between the coupling pipe 153b and the rotation shaft 151 to further strengthen the coupling of the rotor yoke 153 and the rotation shaft 151.

The coupling pipe 153b is formed thereon with a hitching edge 153c, and an edge side of an upper end surface of the bush 157 is formed with a cross-section 157a by which the hitching edge 153c is hitched. Accordingly, the hitch of the hitching edge 153c by the cross-section 157a inhibits the rotor yoke 153 from disengaging downward.

A stopper 171 that is hitched by a hitching edge 121 formed an upper outer periphery of the bearing housing 120 is formed at the body 153a. The hitch of the stopper 171 by the hitching edge 121 of the bearing housing 120 inhibits the rotor from disengaging upwards.

Between the body 153a of the rotor yoke 153 and the coupling pipe 153b there is formed a plurality of bending units 153d which in turn reinforce the strength of the rotor yoke 153.

Referring to FIG. 2, the spindle motor is provided with a thrust plate 145 that inhibits the rotation shaft 151 and the thrust stopper 141 from being worn out by inhibiting the rotation shaft 151 and the thrust stopper 141 from being in direct contact therebetween. The spindle motor is provided with a felt 173 that inhibits the disk 59 from slipping and is also provided with a suction magnet 175 that inhibits the rotor from rising when the spindle motor is driven.

The coupling pipe 153b of the rotor yoke 153 coupled to the rotation shaft 151 is coupled with a clamping device 200 supporting the disk 50 mounted on the body 153a.

Now, the clamping device 200 according to an exemplary embodiment of the present disclosure will be described with reference to FIGS. 2, 3 and 4.

Figure 3:
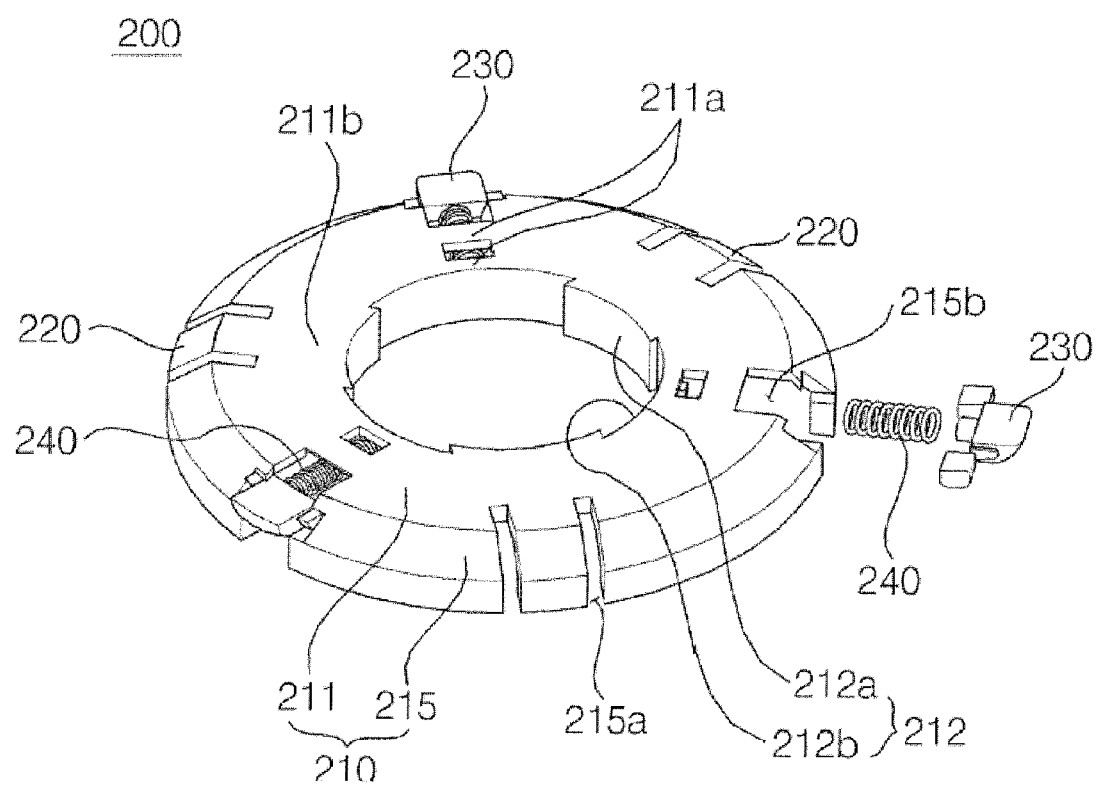
FIG. 3 is a partially exploded perspective view of a clamping device illustrated in FIG. 2
Figure 4:
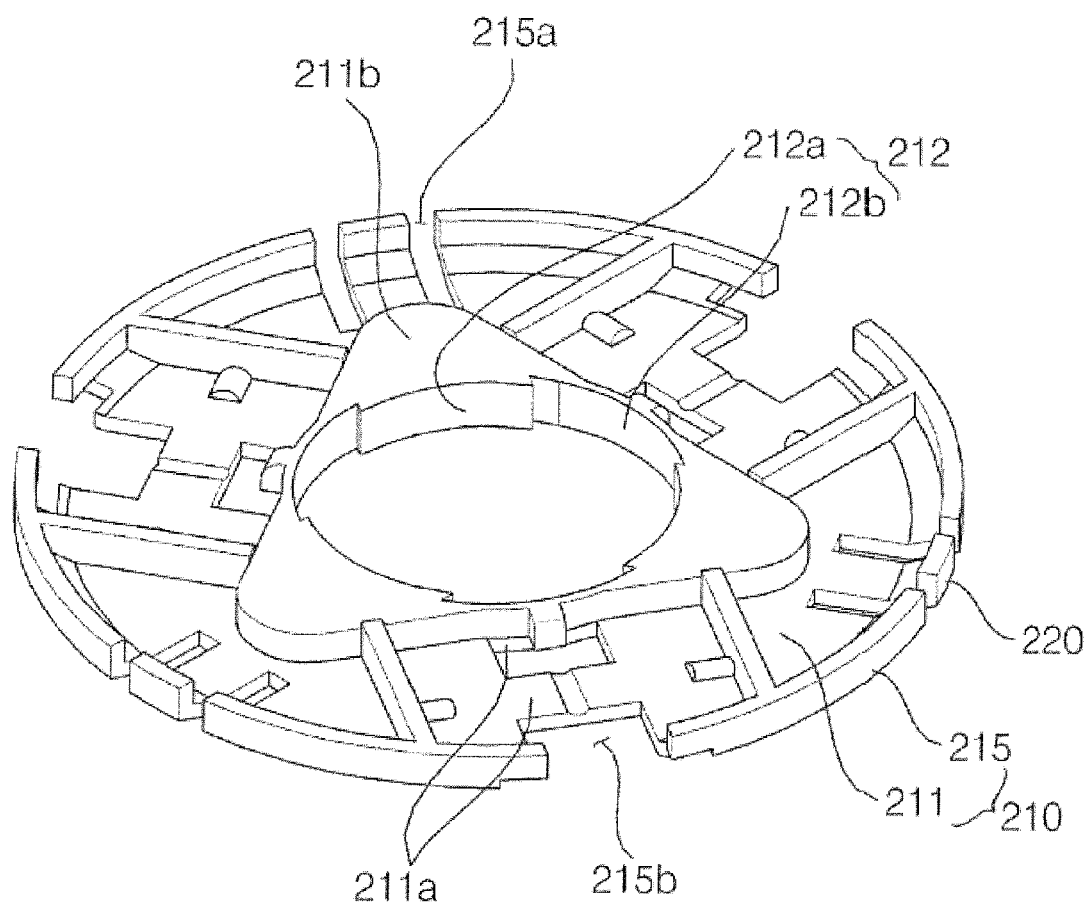
FIG. 4 is a perspective view of a bottom surface of a case illustrated in FIG. 3.

FIG. 3 is a partially exploded perspective view of a clamping device illustrated in FIG. 2 and FIG. 4 is a perspective view of a bottom surface of a case illustrated in FIG. 3.

Referring to FIGS. 3 and 4, the clamping device 200 includes a substantially cylindrical case 210, a plurality of claws 220, a plurality of arms 230 and a resilient member 240.

The case 210 includes a disk-shaped support plate 211 and a ring-shaped lateral plate 215 at an outer periphery, where the lateral plate 215 is bent downward from an edge of the support plate 211 and into which an inner periphery of the disk 50 is inserted. The support plate 211 is centrally formed with a substantially tubular rotor fastener 212 to which an outer periphery of the coupling pipe 153b of the rotor yoke 153 which is the rotor is coupled.

The lateral plate 215 is radially formed with a plurality of through holes 215a about a center of the lateral plate 215, and an edge of the support plate 211 at each through hole 215a side is integrally formed with a claw 220. The claw 220 is resiliently supported to align the center of the disk 50 mounted on the lateral plate 215 with the center of the rotation shaft 151.

Entry holes 215b are respectively formed at portions of the support plate 211 between mutually neighboring through holes 215a and the lateral plate 215 and are linearly and reciprocatingly formed with arms 230. That is, one side of the arm 230 is positioned outside of the lateral plate 215 and the other side of the arm 230 is positioned inside of the lateral plate 215, where the arm 230 reciprocates in the entry hole 215b.

One distal end side of the arm 230 contacts an inner periphery of the disk 50, where if the disk 50 is brought into contact with the arm 230, the arm 230 rotates in a form of a pendulum and linearly move toward an inner and outer direction of the lateral plate 215 at the same time. Therefore, if the disk 50 is completely inserted into the lateral plate 215 to be mounted on the rotor yoke 153, a corner at an upper inner periphery of the disk 50 is hitched by a lower end side of the arm 230 to inhibit the disk 50 from being disengaged upwards of a case 210.

The resilient member 240 is supported at one side thereof by an inner side of the case 210 while is supported at the other side by the other side of the arm 230 to thereby resiliently support the arm 230 to an outside of the lateral plate 215, whereby the disk 50 is securely supported by the arm 230.

The arm 230 is installed in such a manner of entering the lateral plate 215 in a radial direction of the case 210, such that the arm 210 must be secured therein with a space in which the arm can move. Therefore, a portion of the support plate 211 outside of the rotor fastener 212 opposite to the arm 230 is axially very thin. A portion 211a of the support plate 211 outside of the rotor fastener 212 opposite to the arm may be damaged if the coupling pipe 153b of the rotor yoke 153 is press-fitted into the rotor fastener 212. Therefore, the spindle motor according to the exemplary embodiment of the present disclosure is so configured as to inhibit the case 210 from being damaged even if the coupling pipe 153b of the rotor yoke 153 is coupled with the rotor fastener 212.

To be more specific, the claw 220 does not move as it is integrally formed with the case. Therefore, a lateral thickness of a portion 211b of the support plate 211 outside of the rotor fastener 212 facing the claw 220 may be formed thicker than that of other portion. That is, the portion 211b of the support plate 211 outside of the rotor fastener 212 may increase a thickness of lateral direction by extending a height of the rotor fastener 212 of radial direction to an outer radial direction.

Furthermore, a radius of the rotor fastener 212 facing the claw 220 may be formed smaller than that of the rotor fastener 212 facing the arm 230 which is the other portion of the rotor fastener 212. That is, the rotor fastener 212 includes a first guide portion 212a for press-fitting the coupling pipe 153b and a second guide portion 212b for non-press-fitting the coupling pipe 153b, each having a different radius. At this time, the first guide portion 212a defines an inner circumferential surface of the rotor fastener 212 facing the claw 220, and the second guide portion 212b refers to an inner circumferential surface of the rotor fastener 212 facing the arm 230.

An inner circumferential portion of the rotor fastener 212 facing the claw 220 is the first guide portion 212a having a relatively thicker radial thickness, and an inner circumferential portion of the rotor fastener 212 facing the arm 230 is the second guide portion 212b having a relatively thinner radial thickness. The first guide portion 212a is press-fitted by an outer periphery of the coupling pipe 153b while the second guide portion 212b is not press-fitted by the coupling pipe 153b. Accordingly, the case 210 is not damaged even if the coupling pipe 153b is press-fitted into the rotor fastener 212.

In order to secure a strong coupling between the rotor yoke 153 and the case 210, an upper and lower side of the second guide portion 212b of the rotor fastener 212 may be coated with an adhesive to allow the coupling pipe 153b to adhere to the rotor fastener 212.

The following Table 1 shows a coupling strength between the rotor yoke 153 and the case 210 according to an exemplary embodiment of the present invention.

TABLE 1

| Measurement Times | Coupling Strength ($Kg_f$) | | |
| --- | --- | --- | --- |
| | partial press-fit | partial adhere | partial press-fit + partial adhere |
| 1 | 1.1 | 6.1 | 7.2 |

TABLE 1-continued

| Measurement Times | Coupling Strength ($Kg_f$) | | |
|---|---|---|---|
| | partial press-fit | partial adhere | partial press-fit + partial adhere |
| 2 | 1.0 | 6.8 | 7.8 |
| 3 | 1.2 | 6.0 | 7.2 |
| 4 | 1.1 | 7.1 | 8.2 |
| 5 | 1.1 | 6.7 | 7.8 |

Referring to Table 1, when the case 210 is formed with the first guide portion 212a and the second guide portion 212b, and the rotor yoke 153 and the case 210 were partially press-fitted, the coupling strength was 1.0~1.2 $kg_f$, and when the rotor yoke 153 and the case 210 were partially adhered, the coupling strength was 6.1~7.1 $kg_f$ and when the rotor yoke 153 and the case 210 were partially press-fitted and partially adhered, the coupling strength was 7.2~8.2 $kg_f$.

Therefore, the coupling power above a predetermined coupling strength can be obtained even if the rotor yoke 153 and the case 210 are partially press-fitted or partially adhered, but in order to secure a further strong coupling between the rotor yoke 153 and the case 210, it is better to perform the partial press-fitting and the partial-adhesion at the same time according to the exemplary embodiment of the present disclosure.

The size of the second guide portion 212b at the rotor fastener 212 may be properly adjusted according to a desired coupling strength.

The lower end side of the rotor fastener 212 supportively contacts a bending unit 153d of the rotor yoke 153

The spindle motor according to the exemplary embodiments of the present disclosure is configured such that a rotor is press-fitted into a portion of a rotor fastener corresponding to a radially thicker portion out of outer portions of the rotor fastener of a clamping device. A portion of the rotor fastener corresponding to a relatively thinner radial portion is filled up with an adhesive to adhesively couple a case with the rotation shaft side. Consequently, even if the rotation shaft side is coupled with the case, the case is not damaged to therefore enhance the reliability of the product.

Any reference in this specification to "one embodiment," "an embodiment," "exemplary embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A spindle motor comprising:
a rotor including a rotation shaft and a rotor yoke simultaneously rotating with the rotation shaft and mounted with a disk, wherein the rotor yoke comprises a coupling pipe;
a clamping device attachably and detachably supporting the disk and provided with a rotor fastener coupled to the coupling pipe of the rotor, and
a bush interposed between the rotation shaft and the coupling pipe;
wherein the rotor fastener alternatively includes a first guide portion for press-fitting the coupling pipe of the rotor and a second guide portion for non-press-fitting the coupling pipe of the rotor.

2. The spindle motor of claim 1, wherein the first guide portion and the second guide portion are different in respective radii from a center of the rotor.

3. The spindle motor of claim 2, wherein the clamping device comprises: a substantially cylindrical case formed with the rotor fastener; and a plurality of arms supporting the disk, and wherein an inner circumferential portion of the rotor fastener corresponding to the arm forms the second guide portion.

4. The spindle motor of claim 3, wherein the clamping device includes a plurality of claws contacting an inner circumferential surface of the disk, and the inner circumferential portion of the rotor fastener corresponding to the arm forms the first guide portion.

5. The spindle motor of claim 1, wherein an outer peripheral radial side of the second guide portion is coated with adhesive that adheres to the rotor fastener.

6. The spindle motor of claim 1, wherein the first guide portion is thicker than the second guide portion.

7. The spindle motor of claim 1, wherein the rotor yoke comprises:
a substantially cylindrical body having an opening at one side thereof; and
wherein the coupling pipe is protrusively formed at the sealed other surface of the body; and
wherein an inner circumferential portion of the coupling pipe is coupled with the rotation shaft, and an outer periphery of the coupling pipe is coupled with the rotor fastener of the clamping device.

8. The spindle motor of claim 7, wherein a distal end of the coupling pipe is formed with a hitching edge by which a cross-section formed on an upper surface of the bush is hitched.

9. The spindle motor of claim 7, wherein the rotor yoke includes a bending unit connecting the body and the coupling pipe, and the bending unit is supportively contacted by a distal end side of the rotor fastener of the clamping device.

* * * * *